ized very slowly by water at 100— de-
UNITED STATES PATENT OFFICE.

JAMES WRIGHT LAWRIE, OF AURORA, ILLINOIS, ASSIGNOR TO WILLIAM F. JOBBINS, INCORPORATED, OF AURORA, ILLINOIS, A CORPORATION OF ILLINOIS.

PROCESS OF TREATING ALUMINUM SKIMMINGS, SCREENINGS, &c.

1,262,063.  Specification of Letters Patent.  Patented Apr. 9, 1918.

No Drawing.  Application filed August 1, 1914. Serial No. 854,471.

*To all whom it may concern:*

Be it known that I, JAMES WRIGHT LAWRIE, a citizen of the United States, residing at Aurora, in the county of Kane and State of Illinois, have invented a new and useful Improvement in Process of Treating Aluminum Skimmings, Screenings, Dross, Slags, or Analogous Aluminous Materials, of which the following is a specification.

My invention relates to a process of treating aluminum skimmings, screenings, dross, slags or analogous aluminous materials, for the purpose of producing therefrom certain valuable and useful products.

In carrying out my invention the skimmings are first separated by suitable means, such as screens and the like, from the larger particles and pieces of free aluminum or its alloys occurring with them. The iron or its magnetic compounds may also be removed by mechanical means. The residual material now consists largely of finely divided aluminum or its alloys, carbids, nitrids, carbonates, oxids and other metallic compounds, small quantities of other metals and other impurities, some of which are soluble in water. This residue may be utilized for the production of aluminum compounds by treating with a solvent of aluminum either acid or alkaline. But the presence (in more than small quantities) of free metal and of carbids and nitrids in the material is very objectionable, especially when the material is treated directly with acids for the production of aluminum salts. The carbids when acted upon by acid are decomposed, yielding products in part gaseous, which gases consist chiefly of methane and possibly other hydrocarbons. The free metal also reacts with acids, liberating hydrogen. The evolution of these gases causes extensive foaming, thus necessitating either very slow mixing of the material with the acid or considerable dilution of the acid, both of which alternatives are objectionable features in such a process. Likewise, I have found that explosions sometimes occur when the material is directly treated with acid, due probably to the presence of hydrogen and the high temperatures produced. In the acid treatment the presence of free metal has the additional disadvantage that it interferes with the most economical recovery of the copper contained in the material in the form of easily soluble copper compounds, for the free aluminum acts upon the dissolved copper, precipitating the latter and thus mixing it in with the residue from which it is less easily extracted than from the solution. These difficulties are encountered also when the material is to be treated with alkalis for the production of solutions of alkali-metal aluminates, but are there not so great. Another difficulty to be avoided if the most economical utilization of this material is to be accomplished, in the acid treatment, is occasioned by the presence of nitrids in the material. When these nitrids are acted upon by acids, salts of ammonia are produced. These salts will appear in the final aluminum salt, and will therefore contaminate the latter. Further, more acid is required to produce the ammonium salt, and consequently the presence of nitrids results in the necessity of using an excess of acid, which adds nothing to the value of the final product and is therefore wasted. Finally, in the direct treatment of the residue with acid the ammonia is not regained in commercially available form. By my invention which I describe below the material is first suitably prepared, at very small cost, by removing to a large extent the carbids, nitrids and free metal, and then treating the thus prepared material for the recovery of its aluminous and other contents.

In my process the material, from which the larger particles and pieces of any free metal or magnetic iron or its compounds have been removed, is boiled with water under pressure. I have found that while aluminum carbid is only exceedingly slowly decomposed by water boiling at atmospheric pressure, this decomposition is greatly hastened at the higher temperatures by water under increased pressure. Even under these conditions the carbids may not be completely decomposed, but the amount left after the treatment is so small as to cause no difficulty. A similar statement may be made in regard to the free metal. This is oxidized very slowly by water at 100— degrees C., but more rapidly at higher temperatures, and while likewise not completely removed is oxidized so far that it no longer interferes greatly with the acid process. The nitrids are apparently decomposed far more readily than the carbids or the metal, and therefore a temperature high enough to produce any considerable decomposition of the carbids and oxidation of the metal will be sufficient to decompose the nitrids. I find that boiling under a pressure of 80 pounds for three hours under suitable conditions accomplishes this purpose satisfactorily. An important condition for the best results from the process is that the mixture of the material and water is continuously agitated throughout the process of boiling, for if this is not done the solid settles in the tank as a cake and does not enter completely into reaction. The ammonia evolved in this step may be separated from the other gases and collected and the remaining gases utilized.

The resulting residue may then be separated from the liquid, which step has the advantage of removing from the material any soluble substances which may have been originally contained, but this step is not always necessary. The residue from the treatments above described may be treated for the recovery of compounds of aluminum, of copper or its compounds and of other by-products. This may be done in one of two ways. Thus the solid residue, separated if desirable from the liquid, may be treated with a solution of alkaline caustic at elevated temperature, forming an aluminate solution which may be utilized for the production of hydrate of alumina. The preferred method of treating the residue resulting from the boiling with water, however, is to use an acid for the direct production of aluminum salts, preferably sulfuric acid. The material is treated first with diluted sulfuric acid for the removal of the larger part of the iron, which treatment dissolves only a relatively small amount of the aluminous content, the amount of acid being so chosen that only small amounts of aluminum are dissolved. The undissolved portion is separated from the liquid and is treated with concentrated acid, thus forming an aluminum sulfate solution, usually contaminated with copper and small amounts of iron. The copper of the original raw material may not all be found in the solution if there is much free aluminum or its alloys left in the material, as has been shown above. If the amount of iron in the aluminum sulfate need not be limited the preliminary treatment with diluted acid can be omitted. The aluminum sulfate liquor resulting from the treatment with strong acid is then purified from copper by precipitating the latter either as metallic copper or as copper sulfid. This may be done by treating the solution with a metal or metals of higher electrolytic solution pressure than copper, preferably aluminum dust separated from the original skimmings, or by subjecting the solution to electrolysis at a voltage high enough to deposit the copper but not sufficiently high to liberate hydrogen or oxygen. Or the copper may be precipitated as copper sulfid by means of hydrogen sulfid or other sulfids. The solution is then separated from the precipitate and is evaporated to obtain the aluminum salt in solid form.

Various changes may be made in the procedure herein described without departing from the spirit of the invention. Thus the treatment with acid may be made continuous, or the gases other than the ammonia may be utilized, or any other changes may be made which may suggest themselves to those skilled in the art.

I claim:

1. The process of forming aluminum compounds from aluminum skimmings which consists in treating the skimmings to remove ingredients capable of evolving gases when the skimmings are treated with a solvent and then dissolving the residue.

2. The process of forming aluminum compounds which consists in treating aluminum skimmings to remove therefrom ingredients capable of evolving gases when the skimmings are treated with an acid in which said skimmings are soluble and then dissolving the residue in such acid.

3. The process of forming aluminum compounds from aluminum skimmings which consists in boiling the skimmings in water to remove ingredients capable of evolving gases in the subsequent treatment and then dissolving the residue.

4. The process of forming aluminum compounds from aluminum skimmings which consists in boiling the skimmings in water to remove the ingredients capable of evolving gases when the skimmings are treated with an acid in which said skimmings are soluble and then dissolving the residue in such acid.

5. The method of treating aluminum skimmings, screenings, dross, slags or analogous aluminous materials, which consists in first preparing the said material by boiling the same with water under pressure for the purpose of decomposing nitrids and carbids and of oxidizing remaining free metal, then treating the residual solids with acid in which said solids are soluble for the production of an aluminum salt solution, precipitating the copper from the latter, and evaporating the purified aluminum salt solution to obtain the aluminum salt in solid form.

6. The method of treating aluminum skimmings, screenings, dross, slags or analogous aluminous materials from which any larger pieces of free aluminum or its alloys have been removed, which consists in first preparing the said material by boiling the same with water under pressure for the purpose of decomposing nitrids and carbids and of oxidizing the remaining free metal, then treating the residual solids with dilute acid to remove the bulk of the iron, separating the solution from the solids, treating the solids with strong acid in which said solids are soluble, and evaporating the solution to obtain the aluminum salt in solid form.

7. The method of treating aluminum skimmings, screenings, dross, slags or analogous aluminous materials from which any larger pieces of free aluminum or its alloys have been removed, which consists in first preparing the said material by boiling the same with water under pressure for the purpose of decomposing nitrids and carbids and of oxidizing the remaining free metal, then treating the residual solids with dilute acid to remove the bulk of the iron, separating the solution from the solids, treating the solids with strong acid in which said solids are soluble for the production of an aluminum salt solution, precipitating the copper from the latter, and evaporating the purified aluminum salt solution to obtain the salt in solid form.

8. The method of treating aluminum skimmings, screenings, dross, slags or analogous aluminous materials from which any larger pieces of free aluminum or its alloys have been removed, which consists in first preparing the said material by boiling the same with water under pressure and simultaneously agitating the mixture for the purpose of decomposing nitrids and carbids and of oxidizing the remaining free metal, then treating the residual solids with dilute acid to remove the bulk of the iron, separating the solution from the solids, treating the solids with strong acid in which said solids are soluble for the production of an aluminum salt solution, precipitating the copper from the latter, and evaporating the purified aluminum salt solution to obtain the salt in solid form.

JAMES WRIGHT LAWRIE.

Witnesses:
PEARL GRISCH,
WALTER BRAUN.

Copies of this patent may be obtained for five cents each, by addressing the "Commissioner of Patents, Washington, D. C."